(Model.)

W. P. TISDALE.
Dental Forceps.

No. 233,817.  Patented Oct. 26, 1880.

WITNESSES:
H. B. Brown
W. W. Hollingsworth

INVENTOR:
W. P. Tisdale
BY
ATTORNEYS.

United States Patent Office.

WILLIAM P. TISDALE, OF PASS CHRISTIAN, MISSISSIPPI.

DENTAL FORCEPS.

SPECIFICATION forming part of Letters Patent No. 233,817, dated October 26, 1880.

Application filed March 18, 1880. (Model.)

*To all whom it may concern:*

Be it known that I, W. P. TISDALE, of Pass Christian, Harrison county, Mississippi, have invented an Improvement in Dental Forceps, of which the following is a specification.

The invention consists in a rod bifurcated at one end and a rod that has a head embracing the elastic prongs or bifurcations, so as to open and close the jaws which form a part of the prongs, the slide-rod being operated by a hand-screw, all as hereinafter described.

Figure 1:
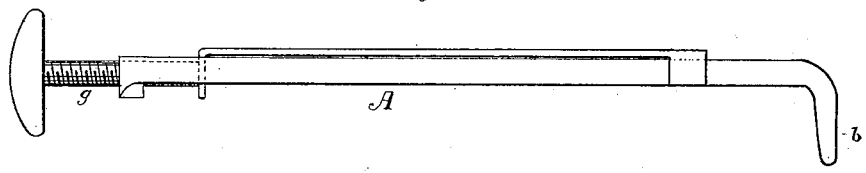
Figure 2:
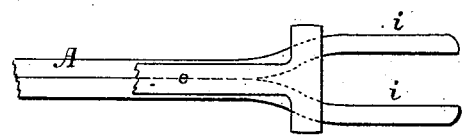

Figure 1 of the drawings is a side elevation, and Fig. 2 a plan view.

In the drawings, A represents a rod having a bend, through which works a screw, $g$, which is swiveled at the end in a slide-rod, $e$, which has a head at its front end. This head embraces the prongs or bifurcations $i\,i$ and presses them together, so as to bring the jaws $b$ against opposite sides of the tooth or roots thereof.

The instrument is particularly adapted to the extraction of the lower front teeth, and, when the jaws are made sharp, for extracting the roots of such teeth.

Having thus described all that is necessary to a full understanding thereof, what I claim as new and of my invention is—

A dental forceps consisting of the rod A, having the elastic front prongs, $i\,i$, of which the jaws $b$ form a part, the slide-rod $e$, having a head that forces the prongs together, and a screw, $g$, working through a bend of rod A and swiveled to the end of rod $e$, as shown and described.

WILLIAM P. TISDALE.

Witnesses:
   JOHN W. BAY,
   N. BUTCHERT.